J. N. DAVIS.
BLOW-OUT PATCH FOR PNEUMATIC TIRES.
APPLICATION FILED APR. 19, 1915.
1,187,418.
Patented June 13, 1916.
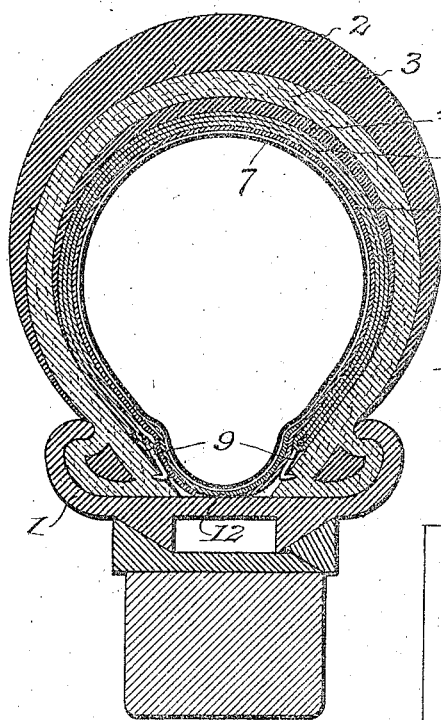
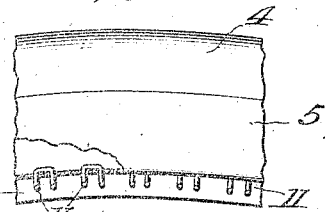
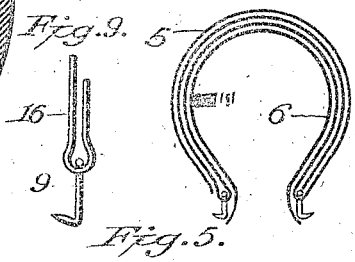
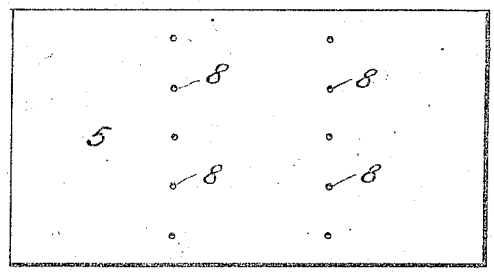
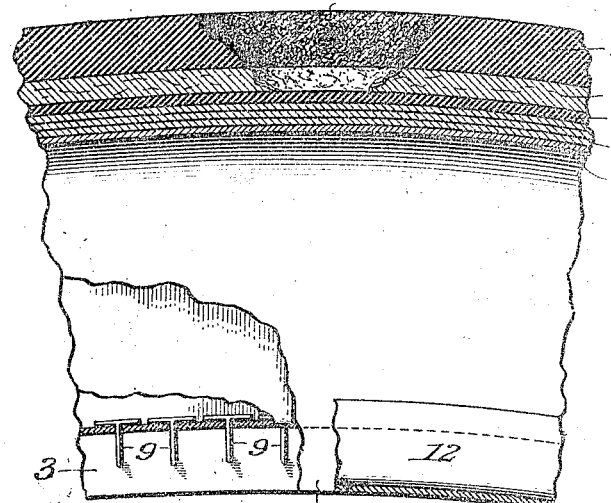
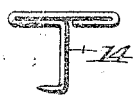
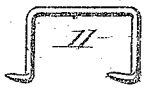
Witnesses:
Mary C Davis
Ida L. Davis.
Inventor
Jasper N Davis

UNITED STATES PATENT OFFICE.

JASPER N. DAVIS, OF DENVER, COLORADO.

BLOW-OUT PATCH FOR PNEUMATIC TIRES.

1,187,418.  Specification of Letters Patent.  Patented June 13, 1916.

Application filed April 19, 1915. Serial No. 22,477.

*To all whom it may concern:*

Be it known that I, JASPER N. DAVIS, a citizen of the United States of America, residing in the city and county of Denver and State of Colorado, have invented a new and useful Blow-Out Patch for Pneumatic Tires, of which the following is a specification.

This invention relates to improvements in the construction of blow-out patches for pneumatic tires.

The object of my invention is to construct a blow-out patch for a cut or blown-out outer casing, that will eliminate the disadvantages of all other makes of inside blow-out patches known to me, on the market at the present time. In such a construction I provide a blow-out patch that is self-adjusting and that will wear as long as a vulcanized section in an outer casing.

The objects of my improved construction as outlined above will be understood from the following specification and accompanying drawings, wherein:—

Figure 1, is a vertical, transverse sectional view through an automobile tire and rim, provided with my improved inside blow-out patch. Fig. 2, is a vertical, longitudinal sectional view of a portion of a tire equipped as shown in Fig. 1, parts of the patch being broken away to show the hooks engaging the inner surface of the tire. Fig. 3, is a side view of a portion of the blow-out patch, partly broken away, and showing a different style of hook from that shown in Fig. 2. Fig. 4, is a diagrammatic view showing the manner of folding the blow-out patch. Fig. 5, is a plan view of the blow-out patch in flat or unfolded position. Figs. 6, 7 and 8 are perspective views of different forms of hooks employed in connection with the blow-out patches. And Fig. 9 is a sectional view of metal side braces which may be used in connection with the hooks shown in Figs. 6, 7 and 8.

Similar letters of reference refer to similar parts throughout the several views.

The patch may be made of any suitable material of which blow-out patches are made with reference to flexibility, but differs from other patches in its construction and the means for securing it in place, in the protection afforded by the tread of the patch against wear from the road bed, and from bulging through a cut or blow-out in the casing. In this construction, one of the serious disadvantages eliminated is that referred to respecting the tread.

It is well known by all experienced tire repair-men that a blow-out patch is very short lived for two reasons: First, when a blow-out patch is put in a casing over a blow-out hole, the patch soon, if not immediately, comes in contact with the tread of the road through the blow-out hole in the casing, resulting in the short life of the blow-out patch, because of its being worn through by the road bed. There is no material that will protect the fabric construction of a pneumatic tire from wear of a road bed, as will rubber, therefore I coat the tread portion of my blow-out patch with a sufficient thickness of rubber vulcanized on it to protect it. This increases the cost but also increases the life of the patch in a much greater proportion. The second reason which is well known, is that a cut or small blow-out in a casing will soon pinch through the fabric of a blow-out patch, whereas a rubber covered blow-out patch will not pinch through the rubber.

Referring to the accompanying drawings: the numeral 1 indicates the rim of a pneumatic tire; 2 is the rubber covering of the tire; 3 the fabric of the tire; 4 the rubber covering protecting my improved blow-out patch; 5 the main member of the blow-out patch; 6 is an inner reinforcing sheet which is vulcanized to the inner lap of the folded member 5; and 7 is the inner tube of the tire.

The main patch 5 is made up of a sheet of suitable flexible material, as shown in Fig. 5, and is provided with two rows of holes 8, which are suitably spaced with reference to the size and strength required in the make-up of the patch. The layers of material shown in Figs. 4 and 5 embody the construction or design of my blow-out patch as shown in Fig. 1. Through the holes 8, in the patch, are passed metal hooks 9, which are shown in Fig. 1, embedded into the inner surface of the fabric 3 of the tire near the wheel rim, which secures the blow-out patch in position. I adopt this method of holding a blow-out patch over a blow-out in a tire because of the advantages it presents over all other methods known to me, some of which methods are as follows:

First, the employment of a small loose patch which is placed over a cut, puncture or small blow-out in the case, which puncture or blow-out, owing to the pressure in the tube, finally becomes large enough to expose the patch to the road bed whereby the patch is worn through.

Second, blow-out patches having metal flanges or clips which clamp around the bead or edges of the casing. I have found these to be impracticable on account of their stiffness in applying the clips around the bead and the difficulty in getting a tire on the rim after the blow-out patch has been put in position. When used with tight fitting casings, it is almost impossible to get a tire on, and after it is on the case in many instances being old and stretched the blow-out patch does not fill the over-sized space in the casing and the result is a pinched tube, because it being forced between the tire and blow-out patch results in the tube being pinched.

Third, there are those forms of blow-out patches having extended flaps on each side. These I find to be satisfactory under certain conditions: if a tire is not too old and stretched to over-size, then the blow-out patch with the size corresponding to the case will fit the inside of the case; if the case is a little stretched the tube will pinch at the ends of the blow-out patch, as referred to above. It also happens many times that side flaps or "ears" as they are sometimes called, are pulled out too far, in which case the tube will pinch, even though the case has not stretched to over-size. The latter trouble is very commonly caused with patches which are made in one size to be used in two or three sizes of casings. It is almost impossible to get them to fit the case inside without leaving a little space between the patch and case, and the result is as before, a pinched tube.

It is also found that in the majority of cases the tire fits the rims so closely that it is very difficult to get a tire on with the flaps of the blow-out patch coming between the tire and rim, even though it is only one thickness of fabric; then when it is desired to put in one, two or three more patches in order to get more service out of the tire, it then becomes impossible to get the tire on, on account of the flaps of the patches making the case fit too tight. My improved blow-out patch is constructed to eliminate these disadvantages, which cause unnecessary expense to the owners of automobiles and the expense in loss of time to the garage or tire men in having to change tubes two or more times due to the pinching of tubes and from hammering on cases to drive them on over the flaps which makes them fit too tight.

With the employment of my improved blow-out patch, a tube will not be pinched between the case and patch by the patch not fitting tight against the inner surface of the tire when applied. There will be no space left between the patch and tire after the inner tube has been inflated, as the patch is self-adjusting to the inner surface of the tire, this feature being my main advantage over other makes, as will be explained farther on.

The metal hooks 9 shown in place in Figs. 1, 2, and 3, can be made of several shapes, a few of which are shown in Figs. 6, 7 and 8. These hooks are made of tempered steel and the end portions are bent at hooking angles and are sharpened to a point. Through the holes 8, in the fabric material shown in Fig. 5, the hooks are placed, before the fabric is folded into the shape shown in Fig. 4. Fig. 4 also shows an extra layer of fabric 6, extending down past the ends of the hooks, for a purpose to be explained later.

In making my blow-out patch, the material is covered with a coating of vulcanizing rubber cement, and when folded to shape and size, together with the layer 6, unvulcanized rubber is then applied to the tread thereof, and when the blow-out patch is vulcanized to the finished form it will appear as shown in Fig. 1, in position in a tire. In Fig. 3 also is shown a broken-away view of the finished blow-out patch. The hooks 11 shown in this figure are of the style shown in Fig. 8.

The function of my improved blow-out patch and the manner of applying it in a blown-out tire is as follows: The blow-out patch is placed in the tire or outer casing over the place to be protected. The tube is then placed in the blow-out patch as shown in Fig. 1, and the tire is fitted on the rim and secured thereto in the usual manner. As the tube 7 is inflated with air, the pressure first presses the blow-out patch against the casing because the upper portion of the patch presents a greater area than the lower portions thereof where the anchoring hooks 9 are located. Therefore before these hooks 9 have sufficient air pressure exerted against them to force them into the fabric bed of the casing, the upper portion of the blow-out patch has fitted itself to the inner surface of the casing, leaving no possible space between the casing and the blow-out patch into which the tube may be forced by the air pressure, with the consequent pinching referred to above, as would result with patches, which are first locked at the bottom of the casing by means of the flaps or metal clips, making the blow-out patch rigid in place with no chance for the air pressure in the tube to first force it up against the surface of the casing, as in the present construction. As the pressure in the tube increases the hooks 9 are forced into the fabric near the edges of the casing, by the terminal portions of the inner layer of fabric 6 and by a protecting portable flap 12, which lies between the tube and the rim, and bears against the adjacent portions of the inner reinforcement 6.

The anchoring hooks 9 shown in Fig. 2, are similar to the hooks 13 and 14 shown in Figs. 7 and 8, being embedded into the bead of the tire, as can be more clearly seen from Fig. 1. In Fig. 2, the patch 5 is broken away to show the head portions of the hooks in place. The terminal portion of the inner layer 6 of the patch which covers the hooks, is also shown broken away. The inner tube portable protecting flap 12, which extends around the tire between the wheel rim 1 and the inner tube 7, is also broken away. This flap is commonly used and protects the tube from the rust of the rim 1 and the pinching of the tube 7, which sometimes occurs, between the tube and the tire, the position of this flap being clearly shown in Fig. 1.

The tread of the tire, as shown in Fig. 2, has a broken-away place 15, which represents a blow-out, cut or worn out place in the tire, which extends through the rubber 2 and the fabric 3. The section shows my blow-out patch protecting this injured place in the tire, the rubber 4 covering the hole and protecting the fabric 5 of the blow-out patch from wear of the road-bed or pinching of the fabric 3 of the casing, as previously explained.

The blow-out patch as described is of the lighter construction and is only designed for the medium and small size tires. For larger and heavier tires, a much stronger construction is required, which I provide for by a stronger and heavier material or more layers of materials. I also employ braces 16 as shown in Fig. 9, which consists of a plate of metal extending the length of the blow-out patch on both sides, with holes in them corresponding to the holes in the fabric. The two metal plates are bent in the form shown, the hooks being put through the holes before the fabric is folded and vulcanized to shape and finish. They also strengthen the patch in cases where a very large or long injury is made in a tire.

From the foregoing description taken in connection with the accompanying drawings, the construction and operation of my improvement can be seen and understood to be a self-adjusting blow-out patch and by the self-adjusting construction the annoyance and expense of pinched tubes, and the unnecessary premature wearing out of blow-out patches, and the difficulty of putting on and removing tires, is entirely eliminated.

Other forms of construction may be used in securing these anchoring hooks or staples or a hinged form to the sides or edges of the blow-out patch without departing from the principles of an inner securing adjustable blow-out patch embodied in my improvement.

Having thus described my invention, what I claim as new and desire to secure by Letters Patent, is:

1. In a blow-out patch for pneumatic tires, a sheet of suitable flexible material, folded upon itself to form three laps of substantially equal length, and hooks which extend through the portions where the two bends occur.

2. In a blow-out patch for pneumatic tires, a piece of suitable flexible material folded upon itself, to form three laps of substantially equal length, the longitudinal free end of the middle lap terminating within the bend formed by the two outer laps, and hooks which extend through the material at the points where the two bends occur.

3. In a blow-out patch for pneumatic tires, a piece of suitable flexible material folded upon itself to form three laps of substantially equal length, the middle lap terminating within the bend formed by the two outer laps, the whole being given a U-shaped curve, and hooks which extend through the material where the two bends occur, the points of which project outward.

4. In a blow-out patch for pneumatic tires, a piece of suitable flexible material bent upon itself to form three laps of equal length, the middle lap terminating within the bend formed by the two outer laps, the whole being given a U-shaped curve, and T-shaped anchors which extend through the material where the bends occur, the shanks of which are bent outward near their lower ends and are pointed.

5. The combination with a pneumatic tire comprising inner and outer tubes, of a patch interposed between the said tubes, the longitudinal edges of which terminate adjacent the terminal edges of the outer tube, and hooks in the terminal edges of said patch, the points of which are adapted to be embedded in the adjacent portions of said outer tube, when the inner tube is inflated.

6. The combination with a pneumatic tire comprising inner and outer tubes, of a patch interposed between said tubes, comprising a piece of suitable flexible material bent upon itself to present three laps of substantially equal length, the middle lap terminating in the bend formed by the two outer laps, and T-shaped anchors which extend through the patch where the bends occur, having outwardly bent pointed ends which are embedded in the outer tube near the terminal edges thereof, when the inner tire is inflated.

7. The combination with a pneumatic tire comprising inner and outer tubes, of a patch of suitable flexible material interposed between the said tubes, the longitudinal edges of which terminate near the terminal edges of the outer tube, the tread portion of said patch having a rubber coating, and anchors at the terminal edges of said patch having outwardly bent pointed ends, which are adapted to be embedded in the terminal portion of the outer tube, when the inner tube is inflated.

8. The combination with a pneumatic tire comprising inner and outer tubes, of a patch interposed between the said tubes consisting of a piece of suitable flexible material folded upon itself to form three laps of equal length, the looped edges of said patch terminating adjacent the terminal edges of the outer tire, a coating of rubber vulcanized upon the tread portion of the patch, and T-shaped anchors extending through the looped edges of said patch having outwardly extending pointed ends which are adapted to be embedded in the adjacent portions of said outer tire by pressure from the inflating of the inner tire.

9. The combination with a rim and an inner and outer tire, of a U-shaped patch, comprising a piece of suitable flexible material folded upon itself to form three laps of substantially equal length, the tread portion of said patch having a coating of rubber vulcanized thereon, T-shaped anchors which extend through the terminal looped edges of said patch, having outwardly bent pointed ends, a reinforcing member within said patch, the terminal edges of which are adapted to bear against the said anchors, said patch and its reinforcing member being interposed between the inner and outer tubes, the pointed ends of said anchors being embedded in the adjacent portions of said outer tube, when the patch and its reinforcing member are expanded by the inflation of the inner tube.

10. In a blow-out patch for pneumatic tires, a U-shaped sheet of suitable material, having anchors along its terminal longitudinal edges provided with outwardly bent pointed ends and a rubber facing upon its tread portion.

11. In a blow-out patch for pneumatic tires, a U-shaped sheet of flexible material, having anchors along its terminal longitudinal edges provided with outwardly bent hook-shaped pointed ends, and a reinforcing sheet of suitable material within the said patch and vulcanized thereto, the longitudinal edges of which terminate beyond the bent portions of the anchors.

12. In a blow-out patch for pneumatic tires, a sheet of suitable flexible material folded upon itself to form three laps of substantially equal length, U-shaped metal reinforcing strips in the folded edges of said patch, and T-shaped anchors the shanks of which extend through said reinforcing strips and said folded edges and terminate in pointed hooked ends.

In testimony whereof I affix my signature in presence of two witnesses.

JASPER N. DAVIS.

Witnesses:
  MARY E. DAVIS,
  IDA L. DAVIS.